(12) United States Patent
Müller et al.

(10) Patent No.: US 7,044,552 B2
(45) Date of Patent: May 16, 2006

(54) LOCKING MECHANISM FOR A VEHICLE SEAT

(75) Inventors: Peter Müller, Kaiserslautern (DE); Thomas Christoffel, Herschweiler (DE); Kadir Yasaroglu, Philippsburg (DE); Holger Trautmann, Blieskastel (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/114,727

(22) Filed: Apr. 26, 2005

(65) Prior Publication Data

US 2005/0212338 A1    Sep. 29, 2005

Related U.S. Application Data

(63) Continuation of application No. PCT/EP04/00543, filed on Jan. 23, 2004.

(30) Foreign Application Priority Data

Feb. 5, 2003    (DE)    ................................ 103 04 574

(51) Int. Cl.
*B60N 2/015* (2006.01)

(52) U.S. Cl. ............... 297/336; 297/378.13; 296/65.03

(58) Field of Classification Search ................ 297/367, 297/378.13, 336; 296/65.03; 248/503.1; 292/216

See application file for complete search history.

(56) References Cited

U.S. PATENT DOCUMENTS

| 5,730,480 | A | 3/1998 | Takamura |
| 5,904,403 | A | 5/1999 | Unckrich |
| 6,123,379 | A | 9/2000 | Yamada et al. |
| 6,286,886 | B1 * | 9/2001 | Odagaki .................. 296/65.11 |
| 6,540,232 | B1 | 4/2003 | Hänsel et al. |
| 6,547,302 | B1 * | 4/2003 | Rubio et al. ............. 296/65.09 |
| 6,598,938 | B1 | 7/2003 | Boltze et al. |
| 6,629,710 | B1 | 10/2003 | Shafry et al. |
| 6,715,841 | B1 | 4/2004 | Christoffel et al. |
| 6,722,739 | B1 | 4/2004 | Klein et al. |

(Continued)

FOREIGN PATENT DOCUMENTS

DE    43 20 626 A1    1/1995

(Continued)

*Primary Examiner*—Peter M. Cuomo
*Assistant Examiner*—Joe Edell
(74) *Attorney, Agent, or Firm*—Womble Carlyle Sandridge & Rice, PLLC

(57) ABSTRACT

In the case of a locking mechanism (1) for a vehicle seat, in particular for a motor vehicle seat, having a pivotably mounted pawl (11) for locking to a mating element (B), and having at least one securing element (25, 31) which secures a locked state by interaction with a first functional surface (21) of the pawl (11), and secures an opened state by interaction with a second functional surface (41) of the pawl (11), the securing element (25, 31) exerts an opening moment on the pawl (11) in the opened state.

29 Claims, 2 Drawing Sheets

| U.S. PATENT DOCUMENTS | | | | FOREIGN PATENT DOCUMENTS | | |
|---|---|---|---|---|---|---|
| 6,742,845 B1 | 6/2004 | Nock | | DE | 296 15 132 U1 | 12/1996 |
| 6,785,770 B1 | 8/2004 | Hoogerbrugge et al. | | DE | 199 02 561 A1 | 8/2000 |
| 6,805,410 B1 | 10/2004 | Christoffel et al. | | DE | 203 02 007 U1 | 5/2003 |
| 6,902,237 B1 | 6/2005 | Petry | | DE | 101 56 200 A1 | 6/2003 |
| 2002/0170381 A1 | 11/2002 | Hänsel et al. | | DE | 101 57 211 A1 | 6/2003 |
| 2003/0042780 A1 | 3/2003 | Klein et al. | | EP | 1 068 985 A1 | 1/2001 |
| 2004/0066077 A1* | 4/2004 | Petry .......................... 297/367 | | WO | WO 02/03207 A1 | 1/2002 |
| 2004/0130199 A1 | 7/2004 | Armburst et al. | | * cited by examiner | | |
| 2004/0245816 A1 | 12/2004 | Nock et al. | | | | | ably mounted pawl for locking to a mating element, extends normal to the second functional surface) running

LOCKING MECHANISM FOR A VEHICLE SEAT

CROSS-REFERENCE TO RELATED APPLICATION

The present application is a continuation of International Application PCT/EP2004/000543, which was filed Jan. 23, 2004. International Application PCT/EP2004/000543 is incorporated herein by reference in its entirety.

BACKGROUND OF THE INVENTION

The present invention relates to a locking mechanism for a vehicle seat, in particular for a motor vehicle seat, having a pivotably mounted pawl for locking to a mating element, and at least one securing element which secures a locked state by interaction with a functional surface of the pawl.

In the case of a known locking mechanism of the type described immediately above, which is referred to as a rotary latch lock, the securing element is designed as a locking bar which, in the locked state, bears against the first functional surface of the pawl in the self-locking region, whereas a spring keeps the pawl open in the opened state.

BRIEF SUMMARY OF SOME ASPECTS OF THE INVENTION

An aspect of the present invention is the provision of improvements to a locking mechanism. In accordance with one aspect of the present invention, a locking mechanism for a vehicle seat, in particular for a motor vehicle seat, is for interacting with a mating element, with the locking mechanism including a pivotably mounted pawl and at least one securing element. The pivotably mounted pawl is for locking to the mating element in a locked state of the locking mechanism, and for being unlocked with respect to the mating element in an opened state of the locking mechanism. The at least one securing element is operatively associated with the pawl for interacting with first and second functional surfaces of the pawl. More specifically, the at least one securing element is for interacting with the first functional surface of the pawl while the locking mechanism is in the locked state, to exert a force on the pawl and thereby at least partially secure the locking mechanism in the locked state. In addition, the at least one securing element is for interacting with the second functional surface of the pawl while the locking mechanism is in the opened state, to exert an opening moment on the pawl and thereby at least partially secure the locking mechanism in the opened state.

Because the at least one securing element secures an opened state by interaction with a second functional surface of the pawl, with the at least one securing element exerting an opening moment on the pawl in this opened state, complete opening is ensured, in particular also in comparison to solutions in which a dead center or friction has to be overcome. This prevents states in which although the mating element can come out of a partially opened hook mouth of the pawl, it cannot engage in it again due to tolerances or a bearing clearance. In addition, the solution according to this aspect of the invention makes it possible to design the inherent prestress (e.g., biasing) of the pawl to be weaker, so that smaller operating forces are necessary. The opening moment is achieved preferably in a manner which is structurally simple to realize by the surface normal of the second functional surface (e.g., an imaginary straight line that extends normal to the second functional surface) running between the axis of rotation of the pawl and that region of the pawl, for example a hook mouth or a toothing, which interacts with the mating element. The at least one securing element bears against the second functional surface in a preferably tangential manner by means of a bearing surface, so that the opening moment is applied in a defined direction.

In one preferred embodiment, which is also secure in the event of a crash, two securing elements are provided, specifically a clamping eccentric and an intercepting component. The clamping eccentric, in the locked state, acts in a spring-loaded manner on the first functional surface via a clamping surface and thereby exerts a closing moment on the pawl. The intercepting component, in the normal situation, is arranged at a small distance from the first functional surface and, in the event of a crash, supports the pawl on its first functional surface by means of an intercepting surface, specifically in a form-fitting manner as a rule, so that a possible opening of the clamping eccentric counter to the prestressing thereof is without any consequences. The intercepting component is preferably prestressed (e.g., biased) via a spring, for example a tension spring. With regard to exertion of the opening moment, the spring that prestresses the intercepting component can be designed to be weaker than in the prior art. The spring that prestresses the intercepting component can be fitted, for example, on the pawl or—in order to reduce the operating forces—on a housing of the locking mechanism.

The intercepting component's intercepting surface, which is for interacting with the first functional surface, and the intercepting component's bearing surface, which bears against the second functional surface, are generally different surfaces. A corner is at one end of the intercepting component's intercepting surface. This corner, for example, also marks the transition to the intercepting component's bearing surface, and is in front as the intercepting surface approaches the first functional surface. The beginning of the pawl's first functional surface is marked by a further, second corner. The term "corner" is intended to be understood in each case within a wide meaning and is also to include regions having radii. In particular, the term is intended also to refer to regions which are not only in the form of a point, i.e. noses, backs and lips. In order to improve the locking security, in a preferred variant no point is at a greater distance from the axis of rotation of the intercepting component than the first corner, with the intercepting surface preferably bearing tangentially on (e.g., traveling tangentially with respect to) the path described by this first corner as it approaches the first functional surface. Correspondingly, as the first corner of the intercepting component approaches the first functional surface of the pawl, no point of the first functional surface of the pawl is at a smaller distance from the axis of rotation of the intercepting component than the second corner of the pawl. Even in the case of unfavorable tolerances, the intercepting component cannot then be prevented from reaching its end position due to a radially increasing region of the intercepting surface. This is achieved, for example, by the intercepting surface being curved in the shape of a circular arc about the axis of rotation of the intercepting component or by the corner being the point of the intercepting surface at the greatest distance from the axis of rotation of the intercepting component. This design of the intercepting surface can be independent of the moment ratios in the region of the second functional surface, i.e. it is only a preferred variant if the intercepting component provided with said corner of the intercepting surface—and optionally also the clamping eccentric—exert an opening moment on the second functional surface of the pawl by means of a bearing surface in the opened state.

The locking mechanism of the present invention can be used at different points of a vehicle seat, for example for connecting the entire vehicle seat to the floor or as a backrest lock for fastening the backrest to the vehicle structure.

Other aspects and advantages of the present invention will become apparent from the following.

BRIEF DESCRIPTION OF THE DRAWINGS

The invention is explained in greater detail below with reference to an exemplary embodiment which is illustrated in the drawings, in which.

DETAILED DESCRIPTION OF THE INVENTION

Figure 1:
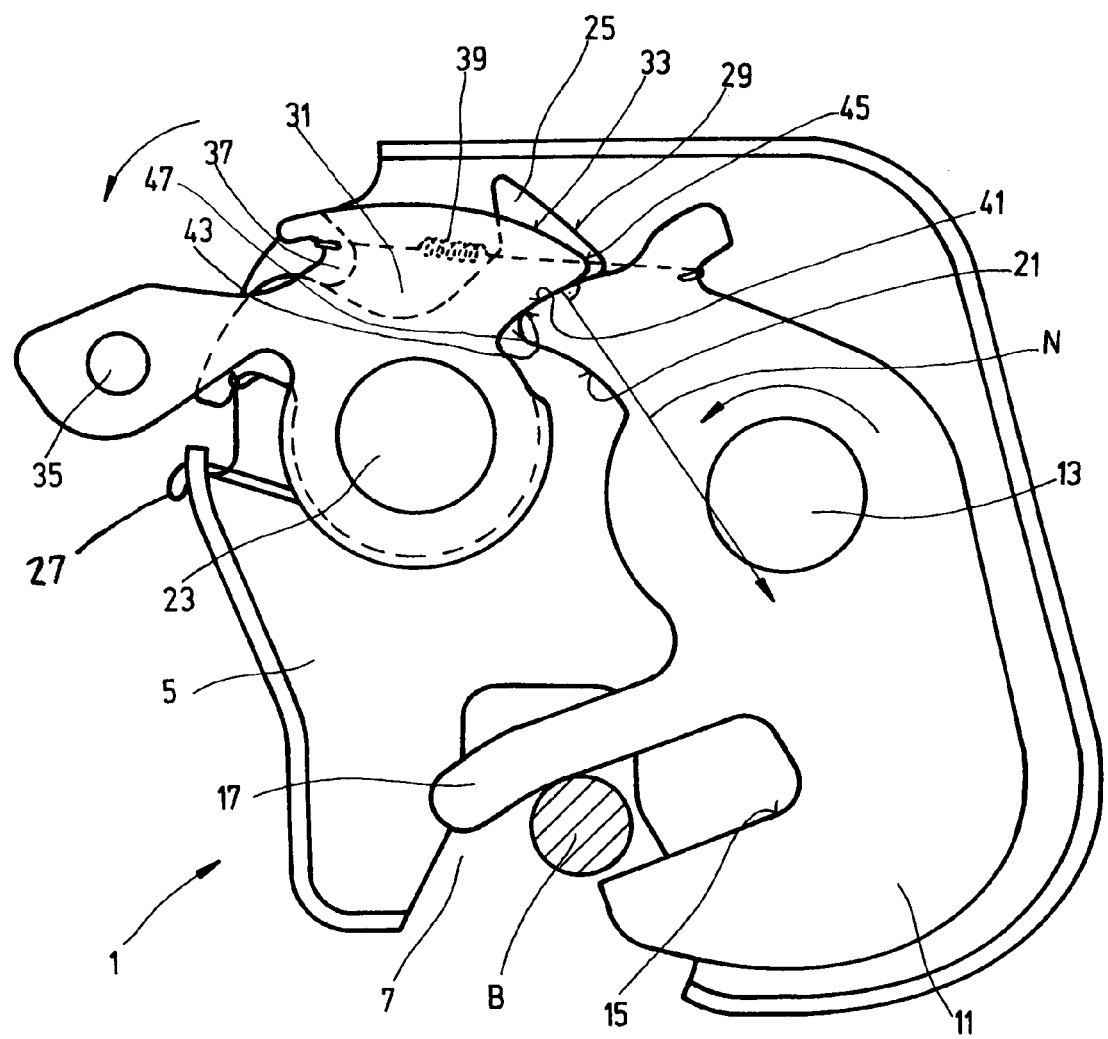
FIG. 1 shows a section through the exemplary embodiment during the opening process.
Figure 2:
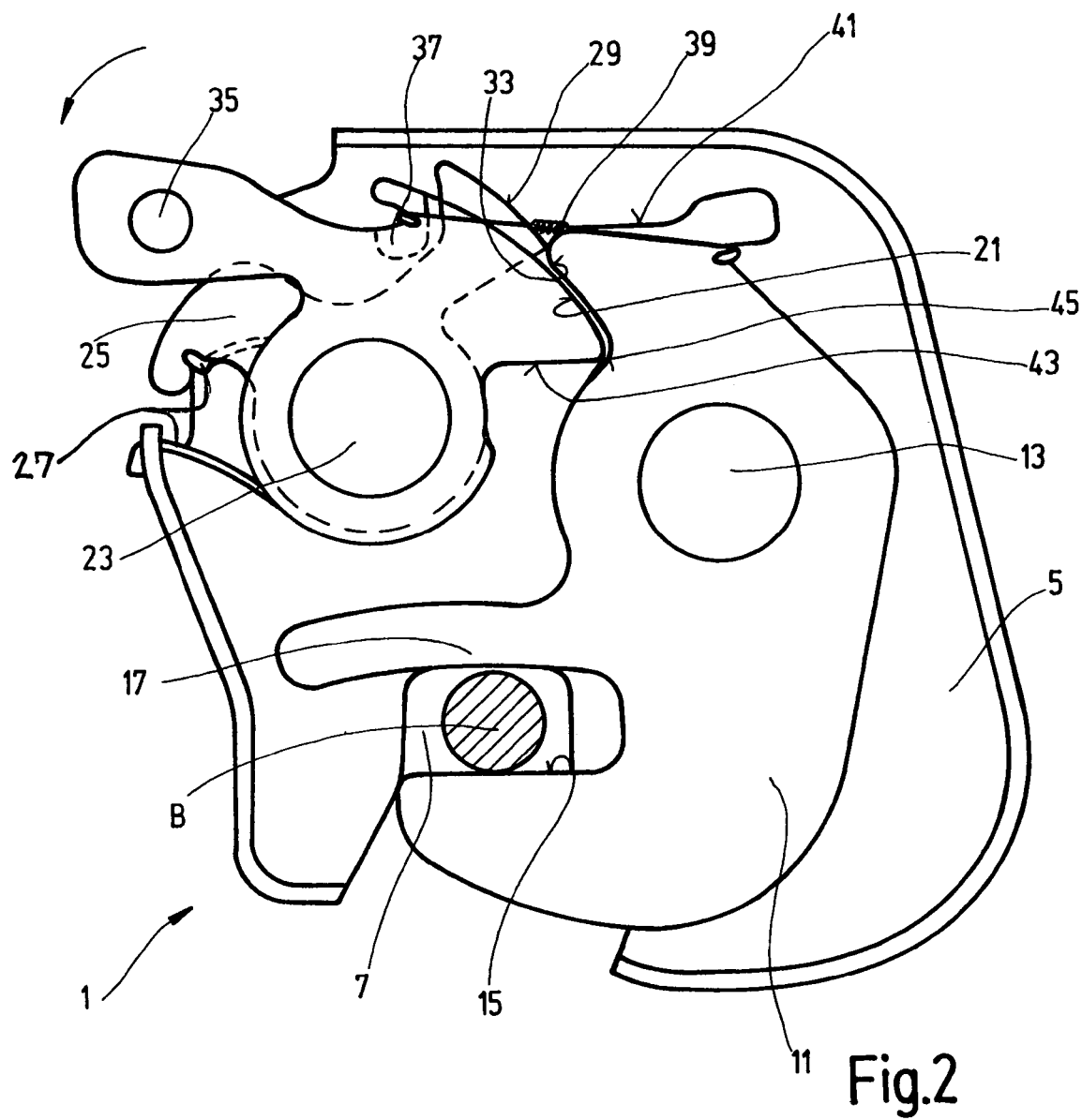
FIG. 2 shows a corresponding section during the locking process.
Figure 3:
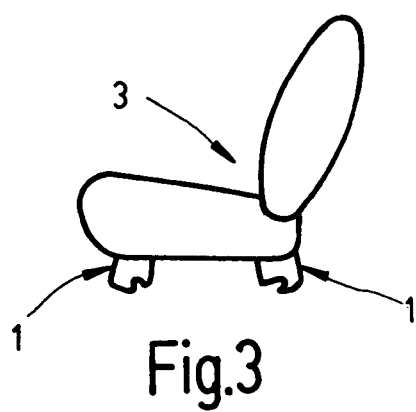
FIG. 3 shows a schematized illustration of a vehicle seat.

A locking mechanism 1 is provided for connecting a vehicle seat 3 in a motor vehicle to the floor. The locking mechanism 1 has a housing 5 having a planar base and raised edges. In this Detailed Description section, the base is considered to be vertically oriented and defines the directional information used. The cover which bears against the housing 5 is not illustrated in the drawings. A bolt receptacle 7 is formed in the lower region of the housing 5. The bolt receptacle 7 opens downward and serves to receive a mating element. The mating element can be a bolt B fixed on the vehicle structure, or the mating element can be another mating element. In this case, the width of the bolt receptacle 7 is larger than the diameter of the bolt B in order to compensate for any play. The mating element may also be a section of a bar.

A pawl 11 is mounted pivotably on a first bearing bolt 13 which is fixedly attached to the housing 5 and protrudes from the housing in the horizontal direction. For interaction with the bolt B, the pawl 11 has a hook mouth 15. In a locked state of the locking mechanism 1, the hooked mouth 15 intersects vertically with the bolt receptacle 7. In an opened state of the locking mechanism 1, the hooked mouth 15 is open obliquely toward the bolt receptacle 7. The hook mouth 15 is upwardly limited by a finger 17 of the pawl 11, the thus defined width of the hook mouth 15 being slightly larger than the diameter of the bolt B. In the locked position, the finger 17 is therefore situated somewhat above the upper end of the bolt receptacle 7 and the bolt B bears against the upper end of the bolt receptacle 7. In the opened position, the finger 17 obliquely intersects with the bolt receptacle 7.

The pawl 11 has a first functional surface 21. In the locked position, the first functional surface 21 faces approximately in the direction of a second bearing bolt 23. The second bearing bolt 23 is arranged parallel to the first bearing bolt 13 and is attached to the housing 5 in the same manner as the first bearing bolt 13. The first functional surface 21 is, for example, curved in the shape of a circular arc and is of concave design. Mounted pivotably on the second bearing bolt 23 is a clamping eccentric 25 which is prestressed (e.g., biased) toward the pawl 11 by means of a clamping spring 27 acting between the housing 5 and the clamping eccentric 25. In the locked state, the clamping eccentric 25 exerts a closing moment on the pawl 11 via a clamping surface 29 which is curved eccentrically with respect to the second bearing bolt 23 and is in non-self-locking contact with the first functional surface 21. The clamping surface 29 is, for example, curved in the shape of a circular arc and is of convex design.

Next to the clamping eccentric 25 on the side facing away from the housing 5, an intercepting component 31 is mounted on the second bearing bolt 23 likewise in a pivotable manner, i.e. is aligned with the clamping eccentric 25. The intercepting component 31 has an intercepting surface 33 which is adjacent to the clamping surface 29 but, in the locked state, is at a distance from the first functional surface 21. The intercepting surface 33 is, for example, curved in the shape of a circular arc and is of convex design. In the event of a crash, when the pawl 11 is possibly subjected to an opening moment and pushes away the clamping eccentric 25, the intercepting surface 33 comes to bear against the first functional surface 21, with the result that the intercepting component 31 serves to support the pawl 11 and to prevent the opening of the same.

On an arm of the intercepting component 31, a release bolt 35 protrudes vertically from the intercepting component 31, i.e. parallel to the bearing bolts 13 and 23. Movement of this release bolt 35 downward from the locked state, for example via a lever or a Bowden cable, causes the intercepting component 31 to pivot away from the pawl 11, i.e. the intercepting surface 33 moves away from the first functional surface 21. The intercepting component 31, if appropriate after a small idle stroke, entrains the clamping eccentric 25, specifically counterclockwise according to the drawing, via a driver 37 which is integrally formed on the intercepting component 31 and protrudes axially in the direction of the clamping eccentric 25. The pawl 11 is then no longer secured. The intercepting component 31 hoists the pawl 11 via a tension spring 39 fitted at one end on the driver 37 and at the other end on the pawl 11.

During opening, the pawl 11 slides with a second functional surface 41, which is aligned approximately transversely with respect to the first functional surface 21, past the clamping eccentric 25 and past the intercepting component 31. Owing to the pivoting movement of the pawl 11, the hook mouth 15 moves back from the bolt receptacle 7 and releases the bolt B. If the release bolt 35 is released, then, firstly, the clamping spring 27 presses the clamping eccentric 25 against the second functional surface 41 and, secondly, the tension spring 39 pulls the intercepting component 31 against the second functional surface 41. The clamping eccentric 25 and the intercepting component 31 bear against the second functional surface 41 in a tangential manner by means of bearing surfaces 43. The surface normal N of the second functional surface 41—and in this position also of the bearing surfaces 43—extends in front of the center of the first bearing bolt 13, i.e. between the center of the first bearing bolt 13, which center defines the axis of rotation of the pawl 11, and the hook mouth 15. The clamping eccentric 25 and the intercepting component 31 therefore exert via the bearing surfaces 43 an opening moment on the pawl 11, said moment keeping the pawl 11 open.

The clamping eccentric 25 and the intercepting component 31 are therefore securing elements for the pawl 11 both in the locked and in the opened state. If, in the event of relatively high friction, the pawl 11 would not completely open just by means of the tension spring 39, i.e. that portion of the material of the pawl 11 which downwardly closes off the hook mouth 15 would partially intersect the bolt receptacle 7 and would thus reduce the region of engagement for the bolt B, this opening moment ensures complete opening of the pawl 11. Since the opening moment of the clamping eccentric 25 would already ensure complete opening of the pawl 11, in a modified form in which the bolt B opens the pawl 11 the tension spring 39 could be fitted on the housing 5.

If the bolt B (or a corresponding component at another locking location) passes into the bolt receptacle 7 and comes to bear against the finger 17, then the bolt B presses the pawl 11 shut. The bearing surface 43 of the intercepting component 31 and the intercepting surface 33 are connected to each other via a first corner 45, the first corner 45 being a small region with a radius. The first functional surface 21 and the second functional surface 41 are connected to each other via a correspondingly designed, second corner 47. As soon as the first corner 45 leaves the second functional surface 41, so that the bearing surface 43 of the intercepting component 31 no longer bears against the second functional surface 41 and, after a minimal pivoting path, this also applying to the clamping eccentric 25, the intercepting component 31 and the clamping eccentric 25 move on account of the prestressing of the clamping spring 27 and of the tension spring 29 past the second corner 47 and then along the first functional surface 21.

In this case, the convex intercepting surface 33 is curved in such a manner that the portion of the intercepting surface 33 that is adjacent the first corner 45 travels tangentially with respect to the path that first corner 45 travels along, and no point of the intercepting surface 33 protrudes radially further than the first corner 45. The intercepting surface 33 is therefore curved either exactly around the second bearing bolt 23, i.e. but at the same time describes the path of the first corner 45, or it is curved eccentrically, the first corner 45 marking the point of the intercepting surface 33 at the greatest distance from the center of the second bearing bolt 23, which center defines the axis of rotation of the intercepting component 31.

Correspondingly, the concave first functional surface 21 of the pawl 11 is curved in such a manner and is arranged in this position of the pawl 11 in such a manner that it is curved virtually around the second bearing bolt 23 or eccentrically thereto, in the latter case the second corner 47 being that point of the first functional surface 21 which, in this position of the pawl 11, marks the smallest distance from the center of the second bearing bolt 23, which center defines the axis of rotation of the intercepting component 31, i.e. there is no radially further protruding point of the first functional surface 21.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A locking mechanism that is for a vehicle seat, and for interacting with a mating element, the locking mechanism comprising:
   a pivotably mounted pawl for locking to the mating element in a locked state of the locking mechanism, and for being unlocked with respect to the mating element in an opened state of the locking mechanism, with the pawl including a first functional surface and a second functional surface; and
   at least one securing element operatively associated with the pawl for
      (a) interacting with the first functional surface of the pawl while the locking mechanism is in the locked state, to exert a force on the pawl and thereby at least partially secure the locking mechanism in the locked state, and
      (b) interacting with the second functional surface of the pawl while the locking mechanism is in the opened state, to exert an opening moment on the pawl and thereby at least partially secure the locking mechanism in the opened state,
   wherein
      the at least one securing element comprises a spring-loaded clamping eccentric and an intercepting component,
      the clamping eccentric includes a clamping surface,
      the clamping surface acts on the first functional surface of the pawl while the locking mechanism is in the locked state, to exert the force on the pawl and thereby at least partially secure the locking mechanism in the locked state,
      the intercepting component includes an intercepting surface, and
      the intercepting component is operative so that, in response to a crash having predetermined characteristics, the intercepting surface supports the pawl by way of the pawl's first functional surface to secure the locking mechanism in the locked state.

2. The locking mechanism according to claim 1, wherein an axis extending normal to the second functional surface extends between:
   the pawl's axis of rotation, and
   the pawl's region that interacts with the mating element.

3. The locking mechanism according to claim 1, wherein:
   the at least one securing element includes a bearing surface, and
   the bearing surface bears, in a tangential manner, against the second functional surface of the pawl while the locking mechanism is in the opened state, to exert at least some of the opening moment on the pawl and thereby at least partially secure the locking mechanism in the opened state.

4. The locking mechanism according to claim 1, further comprising a spring for biasing the intercepting component, wherein the spring is fitted on the pawl or on a housing of the locking mechanism.

5. The locking mechanism according to claim 4, wherein the intercepting component has a corner that is positioned at an end of the intercepting surface, and the intercepting component is configured so that the corner is in front as the intercepting surface approaches the first functional surface.

6. The locking mechanism according to claim 1, wherein the intercepting component has a corner that is positioned at an end of the intercepting surface, and the intercepting component is configured so that the corner is in front as the intercepting surface approaches the first functional surface.

7. The locking mechanism according to claim 6, wherein:
   the intercepting component is pivotably mounted, and
   the corner is farther from the intercepting component's axis of rotation than any other point of the intercepting surface.

8. The locking mechanism according to claim 6, wherein the intercepting component is configured so that while the intercepting component pivots and the corner approaches the first functional surface:
   the corner travels along a path, and
   the portion of the intercepting surface that is adjacent the corner travels tangentially with respect to the corner's path.

9. The locking mechanism according to claim 1 in combination with the vehicle seat, wherein the locking mechanism is mounted to the vehicle seat.

10. A locking mechanism that is for a vehicle seat, and for interacting with a mating element, the locking mechanism comprising:
   a pivotably mounted pawl for locking to the mating element in a locked state of the locking mechanism, and for being unlocked with respect to the mating element in an opened state of the locking mechanism, with the pawl including a first functional surface and a second functional surface; and
   at least one securing element operatively associated with the pawl for
      (a) interacting with the first functional surface of the pawl while the locking mechanism is in the locked state, to exert a force on the pawl and thereby at least partially secure the locking mechanism in the locked state, and
      (b) interacting with the second functional surface of the pawl while the locking mechanism is in the opened state, to exert an opening moment on the pawl and thereby at least partially secure the locking mechanism in the opened state,
   wherein:
   the at least one securing element comprises a spring-loaded clamping eccentric and an intercepting component,
   the intercepting component interacts with the second functional surface of the pawl while the locking mechanism is in the opened state, to exert a first portion of the opening moment on the pawl, and
   the clamping eccentric interacts with the second functional surface of the pawl while the locking mechanism is in the opened state, to exert a second portion of the opening moment on the pawl.

11. The locking mechanism according to claim 10, wherein:
   the clamping eccentric includes a clamping surface,
   the clamping surface acts on the first functional surface of the pawl while the locking mechanism is in the locked state, to exert the force on the pawl and thereby at least partially secure the locking mechanism in the locked state,
   the intercepting component includes an intercepting surface, and
   the intercepting component is operative so that, in response to a crash having predetermined characteristics, the intercepting surface supports the pawl by way of the pawl's first functional surface to secure the locking mechanism in the locked state.

12. A locking mechanism that is for a vehicle seat, and for interacting with a mating element, the locking mechanism comprising:
   a pivotably mounted pawl for locking to the mating element in a locked state of the locking mechanism, and for being unlocked with respect to the mating element in an opened state of the locking mechanism, with the pawl including a first functional surface a second functional surface; and
   at least one securing element operatively associated with the pawl for
      (a) interacting with the first functional surface of the pawl while the locking mechanism is in the locked state, to exert a force on the pawl and thereby at least partially secure the locking mechanism in the locked state, and
      (b) interacting with the second functional surface of the pawl while the locking mechanism is in the opened state, to exert an opening moment on the pawl and thereby at least partially secure the locking mechanism in the opened state,
   wherein:
   the at least one securing element comprises a spring-loaded clamping eccentric and an intercepting component,
   the spring-loaded clamping eccentric has a clamping surface, wherein the clamping surface acts on the first functional surface of the pawl while the locking mechanism is in the locked state, to exert the force on the pawl and thereby at least partially secure the locking mechanism in the locked state, and
   the intercepting component has
      (a) an intercepting surface, wherein the intercepting component is operative so that, in response to a crash having predetermined characteristics, the intercepting surface supports the pawl by way of the pawl's first functional surface to secure the locking mechanism in the locked state, and
      (b) a corner that is positioned at an end of the intercepting surface, whereby a portion of the intercepting surface is adjacent the corner, wherein the corner is in front as the intercepting surface approaches the first functional surface, and the corner is farther from the intercepting component's axis of rotation than any other point of the intercepting surface.

13. The locking mechanism according to claim 12, wherein the intercepting component is configured so that while the intercepting component pivots and the corner approaches the first functional surface of the pawl:
   the corner travels along a path, and
   the portion of the intercepting surface that is adjacent the corner travels tangentially with respect to the corner's path.

14. The locking mechanism according to claim 12, wherein:
   the intercepting component interacts with the second functional surface of the pawl while the locking mechanism is in the opened state, to exert at least some of the opening moment on the pawl.

15. The locking mechanism according to claim 14, wherein the pawl includes a corner, and the first functional surface and the second functional surface are connected to each other via the corner of the pawl.

16. The locking mechanism according to claim 14, wherein an axis extending normal to the second functional surface extends between:
   the pawl's axis of rotation, and
   the pawl's region that interacts with the mating element.

17. The locking mechanism according to claim 12, wherein:
   the intercepting component includes a bearing surface, and
   the bearing surface bears, in a tangential manner, against the second functional surface of the pawl while the locking mechanism is in the opened state, to exert at least some of the opening moment on the pawl.

18. The locking mechanism according to claim 17, wherein:
   the bearing surface and the intercepting surface are connected to each other via the corner of the intercepting component.

19. The locking mechanism according to one of claims 12, further comprising a spring for biasing the intercepting component, wherein the spring is fitted on the pawl or on a housing of the locking mechanism.

20. A locking mechanism that is for a vehicle seat, for interacting with a mating element, and for operating advantageously in the event of a crash having predetermined characteristics, the locking mechanism comprising:
   a pivotably mounted pawl for locking to the mating element in a locked state of the locking mechanism, and for being unlocked with respect to the mating element in an opened state of the locking mechanism, with the pawl including a first functional surface;
   a spring-loaded clamping eccentric having a clamping surface, wherein the clamping surface acts on the first functional surface of the pawl while the locking mechanism is in the locked state, to exert a force on the pawl and thereby at least partially secure the locking mechanism in the locked state; and
   a pivotably mounted intercepting component having
      (a) an intercepting surface, wherein the intercepting component is operative so that, in response to the crash having predetermined characteristics, the intercepting surface supports the pawl by way of the pawl's first functional surface to secure the locking mechanism in the locked state, and
      (b) a corner that is positioned at an end of the intercepting surface, whereby a portion of the intercepting surface is adjacent the corner, wherein the corner is in front as the intercepting surface approaches the first functional surface, and the corner is farther from the intercepting component's axis of rotation than any other point of the intercepting surface.

21. The locking mechanism according to claim 20, wherein the intercepting component is configured so that while the intercepting component pivots and the corner approaches the first functional surface of the pawl:
   the corner travels along a path, and
   the portion of the intercepting surface that is adjacent the corner travels tangentially with respect to the corner's path.

22. The locking mechanism according to claim 21, wherein:
   the pawl includes a second functional surface; and
   the intercepting component interacts with the second functional surface of the pawl while the locking mechanism is in the opened state, to exert an opening moment on the pawl and thereby at least partially secure the locking mechanism in the opened state.

23. The locking mechanism according to claim 20, wherein:
   the pawl includes a second functional surface; and
   the intercepting component interacts with the second functional surface of the pawl while the locking mechanism is in the opened state, to exert an opening moment on the pawl and thereby at least partially secure the locking mechanism in the opened state.

24. The locking mechanism according to claim 23, wherein an axis extending normal to the second functional surface extends between:
   the pawl's axis of rotation, and
   the pawl's region that interacts with the mating element.

25. The locking mechanism according to claim 20, wherein:
   the pawl includes a second functional surface,
   at least one of the intercepting component and the clamping eccentric includes a bearing surface, and
   the bearing surface bears, in a tangential manner, against the second functional surface of the pawl while the locking mechanism is in the opened state, to exert an opening moment on the pawl and thereby at least partially secure the locking mechanism in the opened state.

26. The locking mechanism according to claim 25, wherein the intercepting component includes the bearing surface, and the bearing surface and the intercepting surface are connected to each other via the corner of the intercepting component.

27. The locking mechanism according to claim 25, wherein the pawl includes a corner, and the first functional surface and the second functional surface are connected to each other via the corner of the pawl.

28. The locking mechanism according to claim 20, further comprising a spring for biasing the intercepting component, wherein the spring is fitted on the pawl or on a housing of the locking mechanism.

29. The locking mechanism according to claim 20 in combination with the vehicle seat, wherein the locking mechanism is mounted to the vehicle seat.

* * * * *